Feb. 11, 1964   J. A. MacDONALD   3,120,965
TUBE CONNECTOR
Filed June 20, 1960   2 Sheets-Sheet 1

Inventor
James A. MacDonald
by: /s/
Attorney

Feb. 11, 1964   J. A. MacDONALD   3,120,965
TUBE CONNECTOR

Filed June 20, 1960   2 Sheets-Sheet 2

Inventor
James A. MacDonald
by:
Attorney

United States Patent Office 3,120,965
Patented Feb. 11, 1964

3,120,965
TUBE CONNECTOR
James A. MacDonald, Calgary, Alberta, Canada, assignor to The Consolidated Mining and Smelting Company of Canada Limited, Montreal, Quebec, Canada, a corporation of Canada
Filed June 20, 1960, Ser. No. 37,299
4 Claims. (Cl. 285—18)

This invention relates to a connector for a stretchable, spirally wound, feed tube. It is particularly directed to providing a connector for the flow of granular material, such as chemical fertilizer and seed, to pass from one feed tube to join the flow of material passing through another tube.

Stretchable, spirally wound, steel tubes are known and are widely used, particularly as flexible conduits, such as for feed tubes used with grain drills, fertilizer applicators, grass seed dispensers and the like, with which they are used to direct material from feed cups or hoppers to ground furrows. These spirally wound tubes are known as ribbon tubes and, usually, are formed by winding a ribbon or strip of steel, or other suitable material, into the form of a spiral which is telescopic to a limited extent, and are sufficiently flexible that they are not damaged by movement resulting from irregularities of the surfaces over which the device of which they form part is moved. This type of tube is described and illustrated in United States Patents Nos. 2,762,528 and 2,763,355 issued respectively September 11, 1956, and September 18, 1956. Also, a stretchable, spirally wound flexible tube can be formed of wire as described and illustrated in United States Patent No. 680,748, issued August 20, 1901.

When grain drills are used in conjunction with fertilizer applicators and/or with seed dispensers, allowance may be made for the joint feeding from such pieces of equipment through material receiving funnels, such as are illustrated in Patents Nos. 2,762,528 and 2,763,355. Such developments are quite recent, however, and the majority of farmers having grain drills and seeking fertilizer applicators to use with them, are using grain drills equipped with stretchable, spirally wound feed tubes for directing the seed grain directly from the feed cups or hoppers to the drill boots. Furthermore, there is no allowance at the top of such feed tubes to permit entry of any auxiliary feed tubes. The farmer is faced with having to provide a fertilizer applicator attachment equipped with feed tubes leading to separate, expensive boots which must be attached in position near the boots of the grain drill, or to separate soil openers. Because of these limitations, such fertilizer applicator attachments are usually restricted as to position of the bin in relation to that of the grain drill, have an increased number of parts and are difficult to fit. In addition, they are mountable on only one side of the grain drill.

A principal object of this invention is to provide a connector device by means of which a tube can be connected readily and easily to a second tube at any convenient level along the length of the latter and at any point on its circumference at that level.

An understanding of the connector of this invention can be obtained from the following description, reference being made to the accompanying drawings in which.

Like reference characters refer to like parts throughout the drawings and description of the connector which forms the subject matter of this invention.

Figure 1:
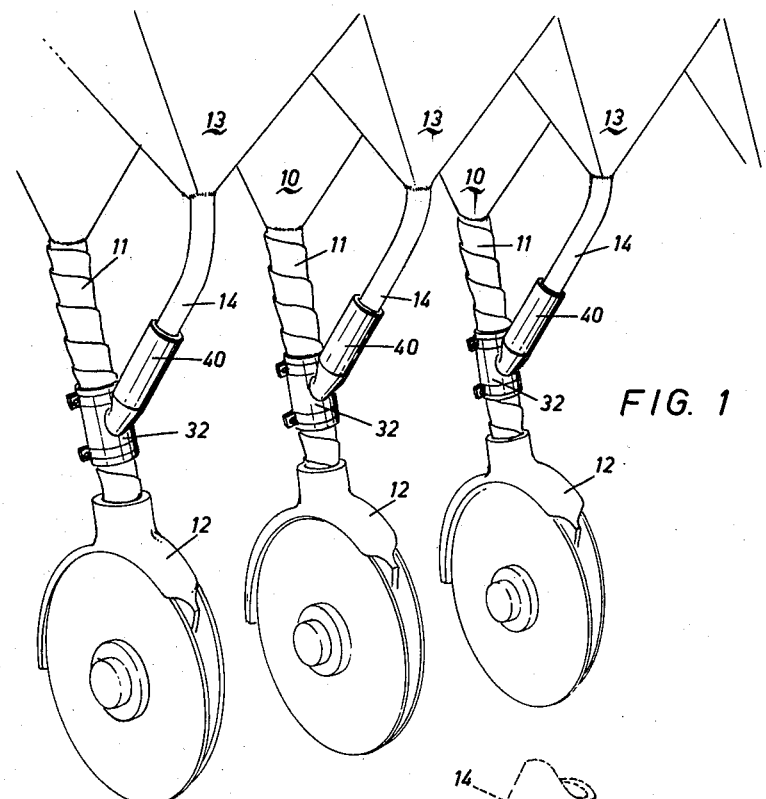
FIGURE 1 is a perspective view of part of a conventional grain drill with a fertilizer applicator attachment, the tubes of which are connected to the discharge tubes of the grain drill.
Figure 3:
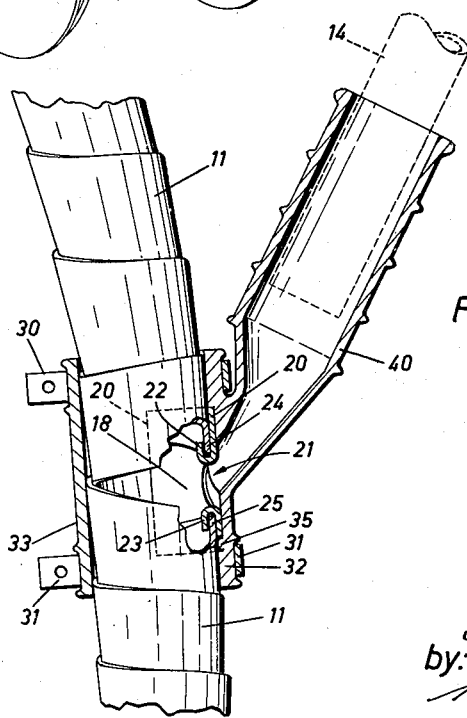
FIGURE 3 is an elevation, partly in section and partly broken away, of the connector as employed to connect the outlet end of a fertilizer applicator discharge tube to a grain drill discharge tube.

Referring to the drawings, the numeral 10 indicates a spout at the bottom of the bin of a grain drill from which seed grain flows into a grain discharge tube 11. The tube 11 extends from the spout 10 to the discharge boot 12. The tube 11 is formed of a spirally wound strip of steel or other suitable material, and is provided with connectors with the spout 10 and boot 12, according to conventional practice. The tube 11 may have a diameter of about 1.25 inches and is flexible and telescopic to a limited extent to accommodate itself to irregularities in the surface over which the device is moved. The tube is manually stretchable, that is, adjacent sections may be stretched apart by hand, a characteristic that will be referred to hereinafter.

The numeral 13 indicates a spout at the bottom of the bin of a fertilizer applicator. A tube 14, which preferably also is formed of flexible material, is connected at its upper end to the outlet end of the spout 13. It is connected, at its lower end, to or fits, preferably in telescopic engagement, into the connector which is described in detail hereinafter and which connects to the tube 11 to provide an uninterrupted path for the flow of granular material from the spout 13 into the tube 11.

The connector comprises means for engaging and retaining opposing edges of an aperture 18 in the tube 11 in spaced apart relation. This means can be in the form of clips which are engaged to opposing edges of the aperture and secured to the edge of the next adjacent section above and below the aperture. Also, a rod having spaced clips can be employed.

A preferred arrangement for engaging opposing edges of the aperture or opening 18 and retaining them in spaced apart relation is in the form of a retractor plate 20 which is of semi-circular cross-section and embraces a portion of the tube 11 at a selected point along its length, the inner surface of the plate conforming with the shape of the outer surface of the tube 11. The retractor plate is formed with an aperture 21 and two spaced diametrically opposed lugs or clips 22 and 23 formed or otherwise provided on the inner surface of the plate on the edge of the aperture 21 and backwardly turned thereto. These lugs which, when the retractor plate 20 is in position, are spaced substantially longitudinally of the axis of the tube 11, are adapted to engage, and to hold in separated position, opposing edges of two adjacent sections of the spirally wound tube, as indicated by the numerals 24—25, thus forming the opening 18 in the tube in alignment with the aperture 21 in the retractor plate. The retractor plate 20 preferably is made of corrosion resistant metal, for example, cadmium plated mild steel, but other corrosion resistant material can be employed, if desired.

Figure 2:
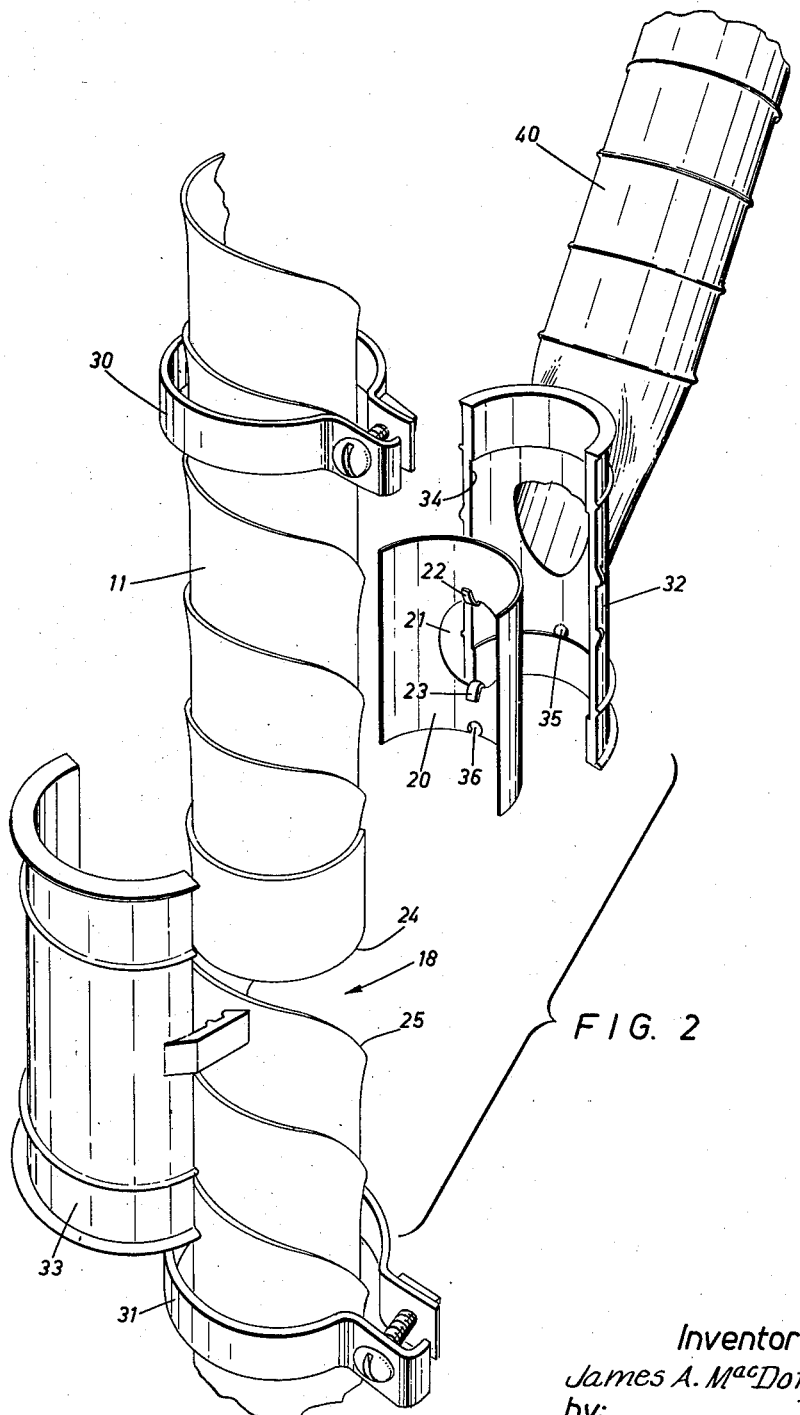
FIGURE 2 is an exploded view of the connector.

The retractor plate 20 is retained in position partly by the separated sections of ribbon tube and partly by a clamp which is formed in two complementary half-sections 32 and 33 secured together, preferably by two identical bands 30 and 31 which, also, are formed, preferably, of corrosion resistant material such as cadmium coated mild steel. The bands 30 and 31 embrace the clamp adjacent to the ends thereof and are adapted to be tightened in place by bolts and nuts according to conventional practice. The half-sections 32 and 33 are conformable to the shape of the tube 11. One half-section 32 is provided or formed with an outwardly extending, and preferably angularly disposed, tubular member 40. The inner end of the tubular member 40 is of a diameter approximately equal to the diameter of the aperture 21 in the retractor plate while the internal diameter of the outer end is slightly greater than the exterior diameter of the tube 14. If desired, an open end sleeve, not shown, can be employed to connect the tube 14 to the tubular member 40. The angle at which the tubular member 40 meets the retractor plate can be any convenient acute angle. Also, means can be provided, for example, recessed portion 34 and stud 35 of section 32 and small hole 36 of retractor plate 20, FIGURE 2, to align the opening at the outlet end of the tubular member 40 with that in the retractor plate.

Primary requirements of the half-sections 32 and 33 of the clamping assembly are to provide a means of connection between the tubular member 40 and the aperture in the retractor plate 20 and, therefore, the opening in the tube 11; to so enclose the aperture and tube opening that spillage or leakage of granular material is prevented; and to accomplish the foregoing purposes without materially affecting the flexibility of the tube 11. A suitable length for the sections 32 and 33 would be equivalent, approximately, to the combined width of three sections of ribbon tube. Design of the clamp assembly need not be restricted to that described above. Another practicable design, for example, does not include separate securing bands but instead has flanges on both sides of both half-sections, fastenable together by standard means such as bolts, or hinge means.

Sections 32—33 and the tubular member 40 can be formed of metal, preferably corrosion resistant. It is preferred, however, to mould or cast them of synthetic, plastic material which is of relatively high compressive strength and shock resistance, such as the rubber-resin blend, acrylonitrile butadiene styrene.

The connector of this invention is readily installed. Two sections of the tube 11 are stretched apart by hand at a selected point along its length. The particular point at which the separation is made depends on several factors such as the position of the bin of the attachment and, therefore, the position of the feed spouts 13 and the length and the flexibility of the feed tubes 14 which are connected to the spouts and which are to be inserted into the open ends of the tubular members 40. The retractor plate 20 is then placed in position against the tube 11 with the aperture 21 in alignment with the so-formed opening in the tube and the lugs 22 and 23 in engagement with the opposing edges of the separated sections. The parts of the clamp are then assembled with the bands 30 and 31 positioned around the sections 32—33 and secured in place.

A recent development in the farm equipment field which has not yet come into widespread use is the corrugated feed tube formed of rubber or rubber-like material. Also, smooth surfaced, flexible feed tubes of synthetic plastic material are coming into use. The clamping assembly of the connector of this invention can be used with such feed tubes also by merely severing the feed tube at the desired point along its length and with its severed ends spaced apart a suitable distance to allow for the entry of granular material therethrough, the clamping assembly is positioned in place and fastened together. Alternatively, the clamping assembly may be fastened in place with the opening at the inner end of the tubular member 40 over a suitable hole cut in the rubber or plastic feed tube.

The improved connector of this invention possesses several important advantages. Primarily, it can be positioned at any convenient level along the length of the tube to which it is attached and at any desired point on the circumference at that level. It can be readily assembled and, in use, it provides an uninterrupted passageway for the flow of granular material from one tube to the other. Its use with a fertilizer applicator attachment and a grain drill permits mounting of the attachment on either the front or rear side of the grain drill. It permits joint feeding of seed and fertilizer. Furthermore, its use is not confined to the manner described above. Not only one, but two or more such connections may be made to a single feed tube, providing passage for flow of granular material from two or more auxiliary feed tubes to a separate single tube. Also, flow from two or more tubes to a separate single tube may be provided for by having two or more tubular members 40 or a bifurcated tubular member 40 connected to half-section 32. Tubular member 40 may be of simple construction as illustrated or may be made up of two or more components for flexibility, if desired.

It will be understood, of course, that modifications can be made in the preferred embodiment of the invention described and illustrated herein without departing from the scope of the invention as defined by the appended claims.

What I claim as new and desire to protect by Letters Patent of the United States is:

1. A connector for a stretchable, telescopic, spirally wound feed tube which comprises a retractor plate conformable to the contour of the outer surface of said feed tube, an aperture in said plate, retracting means provided on the inner surface of said plate on opposite sides of the aperture thereof to separate and retain in longitudinally separated position two adjacent telescopic, spirally wound sections of said feed tube and thereby provide an opening into said feed tube in alignment with said aperture, clamping means conformable to the contour of the outer surfaces of said feed tube and said retractor plate, and a tubular member extending outwardly from said clamping means, said clamping means overlying said retractor plate, and means for securing said clamping means to said spirally wound feed tube.

2. A connector according to claim 1 in which means are provided on said clamping means and said retractor plate for aligning the tubular member with the aperture of said retractor plate.

3. In combination with a stretchable, telescopic, spirally wound feed tube, a connector comprised of a retractor plate conformable to the contour of the outer surface of said feed tube, an aperture in said plate, retracting means provided on the inner surface of said plate on opposite sides of the aperture thereof to engage and hold opposing edges of two adjacent telescopic, spirally wound sections of said feed tube and spaced substantially longitudinally of the axis of said feed tube whereby said opposing edges of said two adjacent sections of said feed tube are separable and retainable in longitudinally separated position to form an opening in said feed tube in alignment with said aperture, clamping means conformable to the contour of the outer surfaces of said feed tube and said retractor plate, and a tubular member extending outwardly from said clamping means alignable with the said aperture, said clamping means overlying said retractor plate and securing the said tubular member to said feed tube in alignment with said aperture.

4. A connector for a stretchable, telescopic, spirally wound tube which comprises means to retain in longitudinally separated position two adjacent telescopic, spirally wound sections of said tube and thereby provide an opening into said tube, enclosing means overlying said opening, an inlet into said enclosing means in communication with the opening in said tube, and means for securing said enclosing means to said spirally wound tube.

References Cited in the file of this patent

UNITED STATES PATENTS

| 566,855 | Friede | Sept. 1, 1896 |
| 1,036,436 | Brennan | Aug. 20, 1912 |
| 1,368,970 | Roberts | Feb. 15, 1921 |
| 2,341,112 | Merrell | Feb. 8, 1944 |
| 2,965,397 | Vandenberg | Dec. 20, 1960 |

FOREIGN PATENTS

| 968,700 | France | May 3, 1950 |